March 27, 1962  T. B. CLINE  3,026,561
MACHINE FOR DE-STRINGING CHAINS OF LINK MEAT PRODUCTS
Filed July 31, 1959  3 Sheets-Sheet 1

INVENTOR.
THEODORE B. CLINE
BY
Pearce and Schaefer plans
ATTORNEYS

March 27, 1962 T. B. CLINE 3,026,561
MACHINE FOR DE-STRINGING CHAINS OF LINK MEAT PRODUCTS
Filed July 31, 1959 3 Sheets-Sheet 2

INVENTOR.
THEODORE B. CLINE
BY
Pearce and Schaefperklaus
ATTORNEYS

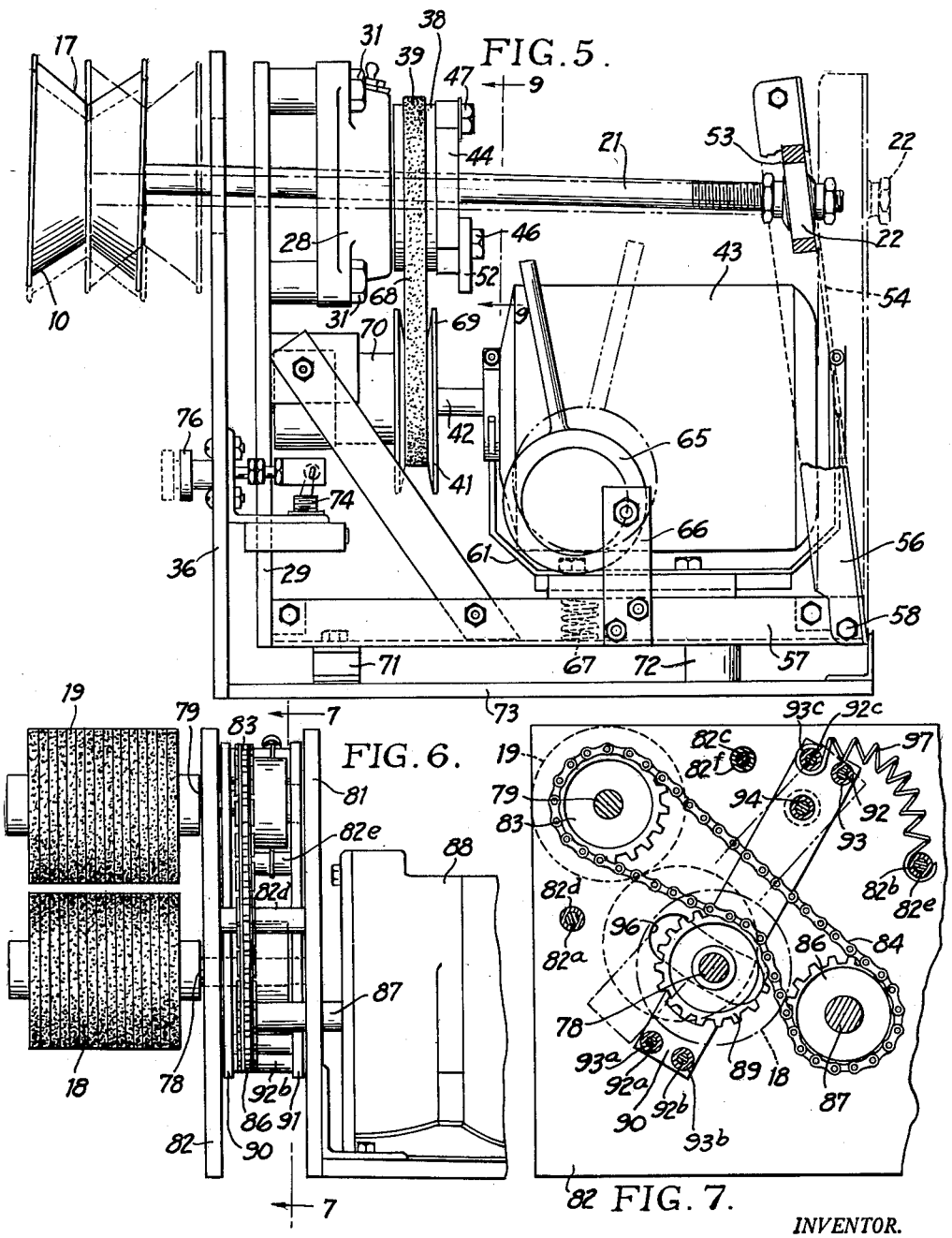

United States Patent Office 3,026,561
Patented Mar. 27, 1962

3,026,561
MACHINE FOR DE-STRINGING CHAINS OF
LINK MEAT PRODUCTS
Theodore B. Cline, Sycamore Township, Hamilton
County, Ohio (7545 Kirtley Drive, Cincinnati 36,
Ohio)
Filed July 31, 1959, Ser. No. 830,892
5 Claims. (Cl. 17—1)

This invention relates to a machine for de-stringing chains of link meat products such as sausages, wieners, frankfurters, and the like.

In order to remove the strings from a chain of encased meat products it is necessary to shake the chain sufficiently to cause the strings to fall away but without shaking the chain sufficiently vigorously to injure the encased meat products.

An object of this invention is to provide a de-stringing machine having a shaker wheel about which the chain of linked meat products is drawn, which wheel is mounted on a shaft that swings to cause the wheel to swing orbitally and shake the chain of linked meat products to shake off the strings as the chain is drawn over the wheel.

A further object of this invention is to provide a machine of this type in which means are provided for mounting the shaft of the shaker wheel in a pair of spaced bearings, each of which permits limited universal swinging of the shaft and in which one of the bearings is mounted off-center in a support bearing so that, when said one of the universal bearings is swung in its support bearing, the wheel is caused to orbit.

A further object of this invention is to provide a machine of the type in which means are provided for moving the other universal bearing toward and away from the first-mentioned bearing to pre-selected positions to vary the amplitude of orbit of the swinging.

A further object of this invention is to provide a machine of this type in which means are provided for automatically drawing the chain of encased meat products over the shaker wheel, which chain-drawing means is adapted to provide a continuous pull on the chain as it passes therethrough.

The above and other objects and features of the invention will be apparent to those skilled in the art to which this invention pertains from the following description and the drawings, in which:

FIG. 5 is a view in side elevation of the shaker section of the machine, the shaker wheel and main shaft being shown in an alternate position in dash-lines, a motor moving cam being shown in an alternate position in double-dot-dash lines.

FIG. 6 is a fragmentary view on an enlarged scale in side elevation of the puller section of the machine;

FIG. 7 is a view in section taken on the line 7—7 in FIG. 6;

In the following detailed description, and the drawings, like reference characters indicate like parts.

Figure 1:
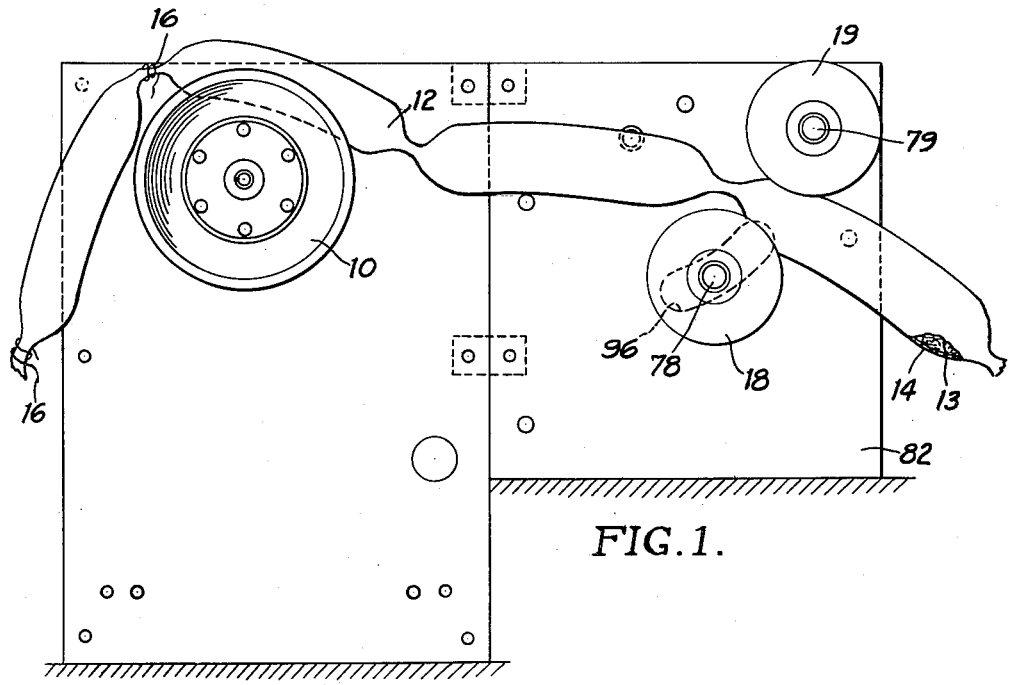
FIGURE 1 is a view in front elevation showing a machine constructed in accordance with an embodiment of this invention showing a string of encased meat products in association therewith, part of the casing being broken away.
Figure 9:
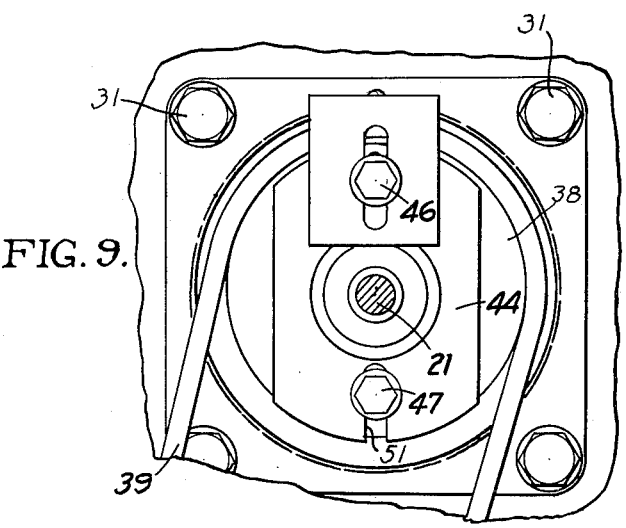
FIG. 9 is a view in section taken on line 9—9 in FIG. 5.
Figure 8:
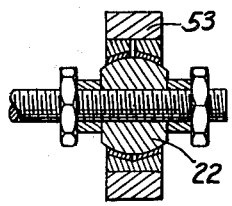
FIG. 8 is a view in section taken on the line 8—8 in FIG. 2, showing the shaft in its alternate position.

In FIG. 1 is shown a machine constructed in accordance with an embodiment of this invention which includes a shaker wheel 10 over which a chain 12 of encased meat products is drawn. The chain 12 includes a plurality of links 13 of a meat product encased in an elongated tubular casing 14. At intervals, the casing is constricted by string ties 16 in the processing of the meat product. The chain 12 is drawn over the wheel 10 by rolls 18 and 19 which grip the chain. As the chain passes over the wheel 10, the wheel 10 moves orbitally to shake the chain and cause the string ties 16 to fall away.

Figure 2:
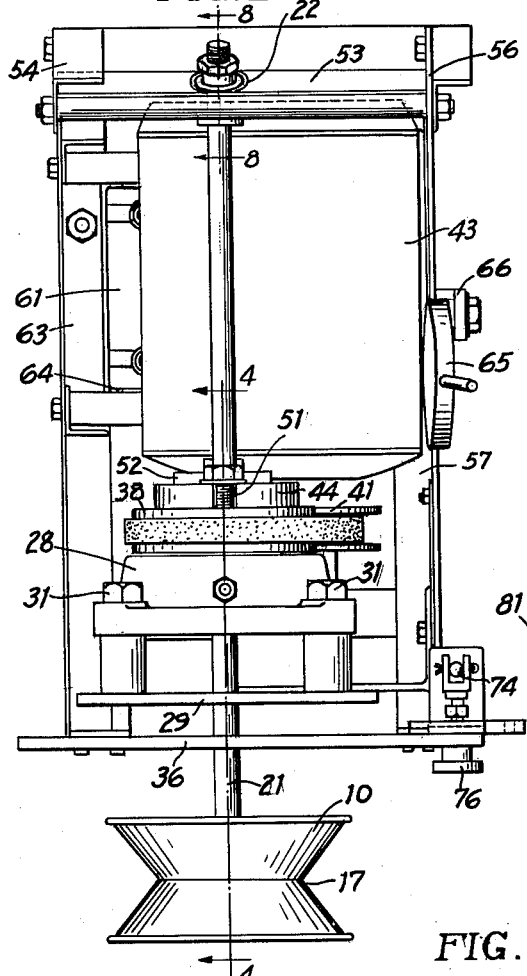
FIG. 2 is a plan view of a shaker section of the machine.
Figure 4:
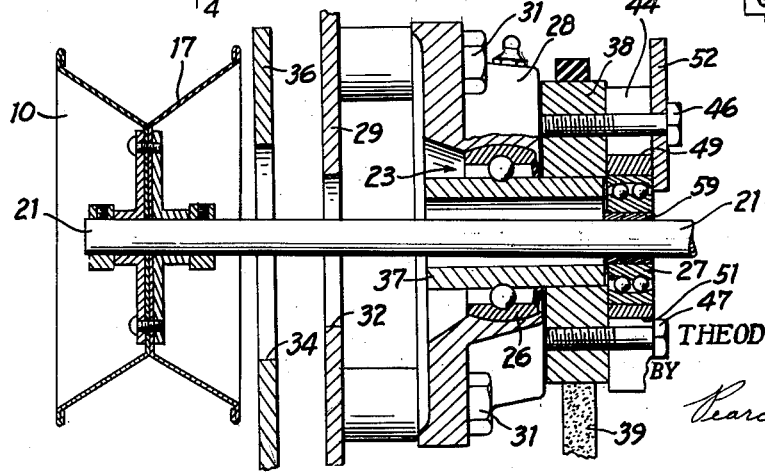
FIG. 4 is a view in section on an enlarged scale taken along the main shaft of the shaker section of the machine taken generally on the line 4—4 in FIG. 2.

As shown in FIGS. 2 and 4, the wheel 10 has a groove 17 therein, through which the chain of encased meat products passes in the manner shown in FIG. 1. The wheel 10 is mounted on a shaft 21. The shaft 21 is mounted in a rear bearing 22, FIG. 2, and a front bearing assembly 23.

The front bearing assembly 23, as shown in FIG. 4, includes a main bearing 26 and a universal bearing 27. The main bearing 26 is mounted in a bearing mount 28 which is attached to a frame plate 29 by bolts 31. The shaft 21 passes through an opening 32 in the frame plate and through an opening 34 in a face plate 36. The main bearing 26 supports a mounting tube 37 through which the shaft 21 also passes.

The mounting tube 37 rotates inside the main bearing 26. A pulley 38 is mounted on the tube 37. A belt 39, which runs on the pulley 38, turns the tube. The belt 39 is driven by a pulley 41 (FIG. 5) mounted on a shaft 42, which is driven by a motor 43.

The universal bearing 27 (FIG. 4) is mounted in an adjustable block 44. The block 44 is attached to the pulley 41 by bolts 46 and 47. As shown in FIG. 4, the bolts extend through slots 49 and 51 respectively in the block 44 so that the block 44 and the universal bearing 27 can be adjusted transversely of the axis of the pulley 41. As shown, the block 44 is mounted with the axis of the universal bearing 27 spaced from the axis of the main bearing and the mounting tube 37 so that, when the pulley 38 turns, the universal bearing 27 and the end portion of shaft 21 journalled therein swing in an orbital fashion to cause the shaker wheel 10 to orbit. The amplitude of the orbit of the shaker wheel 10 is adjusted by moving the block 44 transversely of the axis of the main bearing. A counterweight 52 is attached to the block 44 by the bolt 46.

The amplitude of the orbit of the shaker wheel 10 is also adjusted by movement of the rear bearing assembly 22 (FIG. 5). The rear bearing assembly 22 is mounted in a plate 53. As shown in FIG. 2, the plate 53 is mounted between arms 54 and 56 which are hinged to a base assembly 57 as shown in FIG. 5, the pivot for arm 56 being indicated at 58 so that the rear bearing assembly 22 can be swung between the full-line position of FIG. 5 and the dashed-line position to change the effective distance between the rear bearing assembly 22 and the front bearing assembly 23. As shown in FIG. 4, a bronze sleeve 59 is mounted inside the universal bearing 27 to permit the shaft 21 to slide therein.

The rate of orbiting of the shaker wheel is determined by movement of the motor 43 on its mount. The motor is mounted on a cradle 61 (FIG. 5). The cradle 61 is hinged to a frame member 63 by a hinge pin 64 (FIG. 2). The motor and cradle can be swung by means of a cam 65 (FIGS. 2 and 5). The cam is pivotally attached to an upright bar 66, mounted to the base assembly 57. The cam engages the cradle 61 and can swing between the full-line position of FIG. 5 and the double-dot-dash-line position. A compression spring 67 urges the cradle into engagement with the cam 65. The pulley 41 driven by the motor is of the adjustable or expansion type and, when the cam is swung to the position shown in double-dot-dash-lines, the plates 68 and 69 of the pulley can advance toward each other under the influence of a spring (not shown) inside a cap 70 to vary the effective diameter of the pulley 41.

The base assembly 57 and the frame plate 29 are rigidly connected together to form an inner frame. The inner frame is mounted on a spring mount 71 and on rubber mounts 72, which connect the inner frame to an outer base plate 73, so that the inner frame can vibrate without any substantial vibration of the outer base plate 73 and of the face plate 36. A switch 74 is mounted on the face plate 36. A switch operator 76 is mounted in front of the face plate 36 and can be moved from the full-line position of FIG. 5 to the dash-line position to operate the switch. The switch is connected to the motor by appropriate leads (not shown) so that the actuation of the switch controls the motor.

Figure 3:
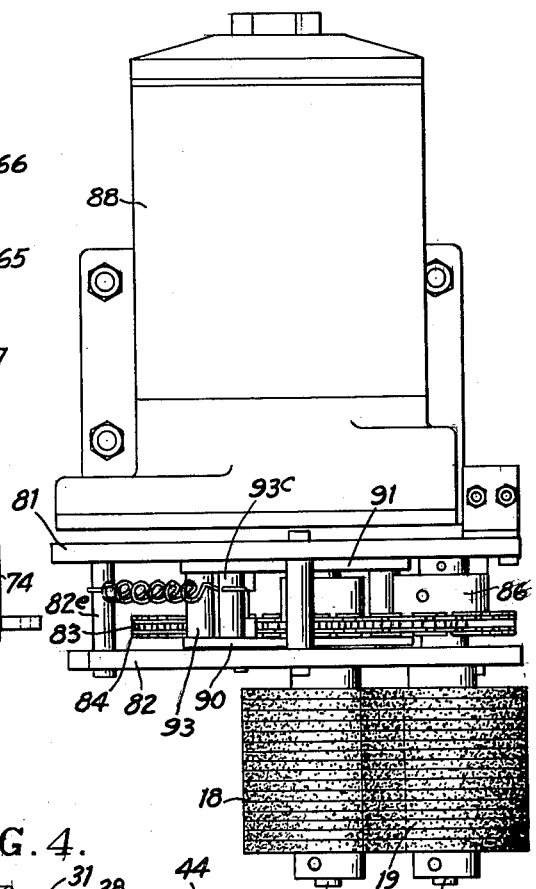
FIG. 3 is a plan view of a puller section of the machine.

The chain of linked meat products is drawn over the shaker wheel 10 by the rolls 18 and 19 (FIG. 1) as already indicated. The faces of the rolls are formed by laminations of fibrous material such as leather or the like. The rolls 18 and 19 are mounted on shafts 78 and 79, respectively. As shown in FIGS. 3, 6 and 7, the shaft 79 is rotatably mounted in two frame plates 81 and 82 which are rigidly connected together by an assembly of screws 82a, 82b, and 82c and spacer sleeves 82d, 82e and 82f mounted on the screws. (See FIG. 7). A sprocket 83 is mounted on a shaft 79 between the plates 81 and 82 (FIGS. 6 and 7). A drive chain 84 (FIG. 7) runs on the sprocket 82 and on a driven sprocket 86. The sprocket 86, in turn, is mounted on a motor shaft 87 and is driven by a motor 88 (FIG. 6). In addition, the chain passes over a sprocket wheel 89 (FIG. 7) which is mounted on the shaft 78. As shown in FIGS. 6 and 7, the shaft 78 is rotatably mounted between a pair of bars 89 and 91. The bars 89 and 91, in turn, are linked together by screws 92, 92a, 92b and 92c (FIG. 7) on which spacers 93, 93a, 93b, and 93c, respectively, are mounted to form a swinging frame work. The swinging frame work is pivotally mounted on a screw 94 which extends between the plates 82 and 81. The sprocket 89, shaft 78, and roll 18 (FIG. 1) swing with the swinging frame work. A slot 96 in the plate 82 receives the shaft 78. A tension spring 97 links the spacer 93c of the swinging frame work with the spacer 82f as shown in FIG. 7, to urge the roll 18 toward the roll 19 in a clockwise direction as shown in FIG. 7 (counterclockwise direction as shown in FIG. 1), and the roll 18 can swing between the position shown in full lines in FIG. 7 and the position shown in dot-dash lines. The chain of linked meat products is threaded between the rolls 18 and 19, as shown in FIG. 1, and operation of the motor 88 (FIG. 6) causes the rolls to turn in a direction to draw the chain of linked meat products to the right as shown in FIG. 1, to pass over the shaker wheel as the shaker wheel orbits. The roll 18 moves toward and away from the roll 19 to accommodate variation in the thickness of the chain and to permit the rolls to engage the chain not only when the chain is thick but also when the chain is constricted.

As the chain of linked meat products is drawn over the shaker wheel 10 by rolls 18 and 19, the chain is shaken by the orbiting of the shaker wheel, and the string ties 16 are shaken off the chain. The rolls 18 and 19 continuously grip the chain and the roll 18 follows the chain. When it is desired to vary the amplitude of the orbit, the rear bearing assembly 22 (FIG. 5) is moved toward and away from the front bearing assembly 23. In addition, if a greater variation of the amplitude of orbit is required, the bolts 46 and 47 (FIG. 4) can be loosened to release the block 44, and the block 44 can be moved transversely of the axis of the main bearing 26 (FIG. 4).

The de-stringing machine illustrated in the drawings and described above is subject to structural modification without departing from the spirit and scope of the appended claims.

Having described my invention, what I claim as new and desire to secure by Letters Patent is:

1. A machine for removing strings from a string-carrying chain of encased meat products which comprises a frame, a shaft, spaced shaft-supporting bearings supporting said shaft, a main bearing mounted on said frame, means on the main bearing for mounting one of said shaft-supporting bearings in the main bearing and off-center thereof for rotational movement therein, means for movably mounting the other shaft-supporting bearing on the frame for movement toward and away from the main bearing, whereby one end portion of the shaft is caused to orbit when the main bearing rotates, a shaker wheel mounted on the orbiting end portion of the shaft, means for rotating the main bearing, and means adjacent the shaker wheel for drawing the chain of encased meat products over the shaker wheel, whereby the shaker wheel shakes the chain to shake strings from the chain, the amplitude of orbit of the shaker wheel being varied when the other shaft-supporting bearing in advanced toward and away from the main bearing.

2. A machine for removing strings from a string-carrying chain of encased meat products which comprises a frame, a shaft, spaced shaft-supporting bearings supporting said shaft, a main bearing mounted on said frame, a tubular support rotatably mounted on the main bearing surrounding a portion of the tubular support, a pulley mounted on the shaft, a bearing block releasably attached to the pulley off-center thereof, one of said shaft-supporting bearings being mounted in said bearing block for rotational movement relative to the main bearing, means for mounting the other shaft-supporting bearing on said frame, means for turning the pulley to cause one end portion of the shaft to orbit, a shaker wheel mounted on the orbiting end portion of the shaft and means for drawing the chain of encased meat products over the shaker wheel, whereby the shaker wheel shakes the chain to shake strings from the chain.

3. A machine for removing strings from a string-carrying chain of encased meat products which comprises a frame, a shaft, spaced shaft-supporting bearings supporting said shaft, a main bearing mounted on said frame, means on the main bearing for mounting one of said shaft-supporting bearings in the main bearing off-center thereof for rotational movement therein, means for mounting the other shaft-supporting bearing on said frame, whereby one end portion of the shaft is caused to orbit when the main bearing rotates, a shaker wheel mounted on the orbiting end portion of the shaft and a chain-drawing assembly adjacent the shaker wheel for drawing the chain of encased meat products over the shaker wheel whereby the shaker wheel shakes the chain to shake strings from the chain, said chain-drawing assembly comprising a second frame, a pair of shaft-supported rolls, means for mounting the shaft of one of said rolls on the second frame adjacent and spaced from the shaker wheel, means for mounting the shaft of the other of said rolls on said second frame parallel to the shaft of the first roll and for lateral movement toward and away from the shaft of the first roll, means for urging the movable shaft toward the shaft of the first roll, whereby the rolls are adapted to grip the chain of encased meat products, and means for turning said rolls in a direction to advance the chain over the shaker wheel.

4. A machine for removing strings from a string-carrying chain of encased meat products which comprises a frame, a shaft, spaced shaft-supporting bearings supporting said shaft, a main bearing mounted on said frame, means journalled in the main bearing, one of said shaft-supporting bearings mounted on and for rotational movement relative to said means journalled in the main bearing and off-center of the main bearing, means mounting the other shaft-supporting bearing on said frame, said shaft being journalled in said shaft-supporting bearings and having an orbitable end portion projecting on the opposite side of the main bearing from the shaft-supporting bearing mounted on said frame by said mounting means, a shaker wheel mounted on the projecting orbitable end portion of the shaft, means for rotating the means journalled in the main bearing, and means adjacent the shaker wheel for drawing a chain of encased meat products over the shaker wheel, whereby the orbitable end portion of the shaft is caused to orbit when the means journalled in the main bearing is rotated and the shaker wheel shakes to shake strings from a chain of encased meat products cooperatively engaged therewith.

5. A machine for removing strings from a string-carrying chain of encased meat products which comprises a frame, a shaft, spaced shaft-supporting bearings supporting said shaft, a main bearing mounted on said frame, means journalled in the main bearing, one of said shaft-supporting bearings mounted on and for rotational movement relative to said means journalled in the main bearing and off-center of the main bearing, means mounting the other shaft-supporting bearing on said frame, said shaft being journalled in said shaft-supporting bearings and having an orbitable end portion projecting on the opposite side of the main bearing from the shaft-supporting bearing mounted on said frame by said mounting means, a shaker wheel mounted on the projecting orbitable end portion of the shaft and means for rotating the means journalled in the main bearing, whereby the orbitable end portion of the shaft is caused to orbit when the means journalled in the main bearing is rotated and the shaker wheel shakes to shake strings from a chain of encased meat products cooperatively engaged therewith.

References Cited in the file of this patent
UNITED STATES PATENTS

| | | |
|---|---|---|
| 2,695,217 | Anderson et al. | Nov. 16, 1954 |
| 2,795,811 | Rune et al. | June 18, 1957 |